United States Patent [19]
McFarland et al.

[11] 3,761,676
[45] Sept. 25, 1973

[54] PORTABLE ELECTRON BEAM WELDING APPARATUS

[76] Inventors: George C. McFarland, 535 Bobby Dr., Danville, Calif. 94526; Clifford F. Leader, 6946 Fairview Dr., El Cerrito, Calif. 94530

[22] Filed: May 20, 1971

[21] Appl. No.: 137,568

[52] U.S. Cl. .................................. 219/121 EB
[51] Int. Cl. ............................... B73k 15/00
[58] Field of Search ............ 219/121, 121 EB, 219/121 EM, 72, 74; 250/49.5 A, 49.5 R, 49.5 TE; 137/630.19

[56] References Cited
UNITED STATES PATENTS

| | | | |
|---|---|---|---|
| 2,404,157 | 7/1946 | Ahalt | 219/74 |
| 2,459,812 | 1/1949 | Griffiths | 219/74 |
| 3,136,883 | 6/1964 | Radtke | 219/121 EB |
| 3,424,891 | 1/1969 | Anderson et al. | 219/121 EB |
| 3,418,526 | 12/1968 | Simon et al. | 219/121 EB X |
| 3,235,727 | 2/1966 | Shapiro | 250/49.5 |
| 3,219,792 | 11/1965 | Pederson | 219/121 EM X |
| 3,283,120 | 11/1966 | Spruck | 219/121 EB |
| 3,243,570 | 3/1966 | Boring | 219/121 EB |
| 623,909 | 4/1899 | Kaeferle | 137/630.19 X |

Primary Examiner—J. V. Truhe
Assistant Examiner—Gale R. Peterson
Attorney—C. Michael Zimmerman

[57] ABSTRACT

An electron beam welding unit is described which enables an operator to directly manipulate the orientation of the electron gun forming the welding beam in order to control the location on a workpiece at which the beam impinges. To this end, the electron gun is mounted within a vacuum chamber on a first portion of its wall which can be moved with respect to the remainder of the vacuum chamber wall. Such first wall portion of the chamber is connected to the remainder of the chamber wall by a flexible bellows which permits the desired movement of the first wall portion while yet assuring integrity of the vacuum within the chamber. A handle for grasping by the operator is provided on the exterior surface of the first wall portion so that the operator can move the wall and, hence, move the electron gun to change the path of its beam. The electron gun of the unit is in the form of a cartridge which is easily removable for replacement and is provided with a structurally stable electron generating filament. The unit further includes a high voltage power supply which is quite compact and assures low current ripple. The power supply and a full vacuum system for the unit, including an unique valve arrangement, are all housed together with the remainder of the unit to provide a small, portable unit.

16 Claims, 9 Drawing Figures

INVENTORS
George C. McFarland
BY Clifford F. Leader

L. Michael Zimmerman
ATTORNEY

Fig-8

PORTABLE ELECTRON BEAM WELDING APPARATUS

BACKGROUND OF THE INVENTION

The present invention relates to apparatus for directing impingement of a beam of radiation onto an object and, more particularly, to such an apparatus which is compact and portable and is especially adapted for electron beam welding and the like.

Electron bombardment is now commonly used as a heat source for precision welding, brazing, or annealing parts made of various materials. The bombardment is obtained by generating an electron beam and directing the same onto the part or workpiece to be heated. It is generally necessary to change the location at which the beam impinges on the object being irradiated. For example, in welding, it is necessary to continually move the point of impingement along the joint of the two pieces to be joined in order to provide the desired heating in an even manner along the full joint.

The electron bombardment must take place within an evacuated environment, e.g., at a pressure of $10^{-5}$ torr. Because of this, the formation of the electron beam and the bombardment generally take place within a vacuum chamber. It will be appreciated that the vacuum chamber will generally prevent the operator from directly moving during an operation either the electron gun for generating the beam or the workpiece in order to change the point of impingement of the beam on the workpiece. For this reason, various mechanisms have been provided to enable the operator to control the movement from outside the chamber. For example, in some electron beam generating devices the electron gun for generating the beam is mounted on tracks or the like to permit it to be moved within the chamber. In others, it is the support for the workpiece which is mounted on tracks or a similar mechanism to provide the relative movement between the workpiece and the gun. Because the desired movement of either the gun or workpiece must be controlled from outside the evacuated chamber, various vacumm interlocks and the like have to be provided through the chamber wall leading to knobs, levers or switches for manipulation by the operator. It will be appreciated that these types of controls, though, will not give the operator a good "feel" for the movement which he is providing. That is the actuating movements of turning a knob or flipping a switch, for example, are only indirectly related to the movement which will be caused within the chamber, and the operator must have considerable experience before he can correlate the movements to provide the precise control that is often necessary in precision electron beam work.

Existing electron beam generating units for welding and the like have other disadvantages as well. For example, because of the necessity of providing a vacuum system for evacuating the work chamber, as well as a power supply for powering the electron beam generating device, most of such systems are made up of a plurality of separated subsystems. The result is that the beam generating units are not portable and all work must be brought to them, rather than they taken to the work. This has restricted the use of electron beam welding and brazing of large, unportable parts. Moreover, many available systems lack flexibility and, in general, have a relatively high initial cost and require large maintenance expenditures.

SUMMARY OF THE INVENTION

The present invention is an apparatus for directing impingement of a beam of radiation onto an object which is especially adapted for electron beam welding and the like and which enables direct manipulation by the operator of the location of the place of impingement of the electron beam on a workpiece. To this end, the apparatus includes, as is conventional, a chamber for defining an evacuated volume adjoining the portion of an object or workpiece to be irradiated with an electron beam. If further includes means such as an electron gun for introducing the desired beam of radiation to the chamber. The wall of the chamber includes at least two portions. A first one of such wall portions has the beam introducing means mounted thereon or otherwise associated with it for movement therewith. In this connection, the means for introducing a beam of radiation into the chamber is most desirably an electron beam gun which is mounted within the chamber on the innersurface of the wall first portion.

The remainder of the chamber wall generally defines the evacuated volume, and connecting means, e.g., a flexible bellows, secures the first portion of the wall to the remainder of the chamber wall in a generally vacumm tight manner enabling the first wall portion to be moved or reoriented with respect to the remainder of the wall. A handle for grasping by an operator is secured to the first wall portion exteriorly of the chamber.

It will be appreciated that with the above arrangement an operator utilizing the apparatus can directly manipulate the angular orientation of the first wall portion with respect to the remainder thereof by merely grasping the handle and moving the same as desired. Movement of this wall portion will also reorient the beam introduction means angularly with respect to the remainder of the chamber, and, thus, change the path of the beam through the chamber. In this manner, the operator can directly manipulate the path of the beam through the chamber and, hence, change the point of impingement of the beam on an object supported within the chamber, in a natural manner enabling precise control of the point of impingement. That is, the movement of the gun within the chamber closely follows the control movement of the operator in a manner which should be familiar to the operator and for which he should have a good feel since the movements are basically related to one another.

The apparatus of the invention includes other features and advantages which make the same especially useful and desirable for electron beam welding and the like. For example, it includes means for removably mounting the electron gun within the chamber in a quite simple manner which enables the same to be easily replaced as necessary. In this connection, the filament of the gun is provided with an unique support arrangement assuring its structural integrity at the extended high operating temperatures to which such a filament is often subjected. The apparatus of the invention also desirably includes as an integral part of the combination a power supply for the electron gun which is quite compact and yet assures low current ripple. A vacuum system having a valve and valve control arrangement assuring fail-safe operation while yet being quite simple and compact is also provided as part of the invention. These and other features and advantages of the invention will become apparent and will be described in more detail in the following description of a preferred embodiment.

BRIEF DESCRIPTION OF THE DRAWINGS

With reference to the accompanying four sheets of drawings.

DETAILED DESCRIPTION OF THE PREFERRED EMBODIMENTS

Figures 1, 2:
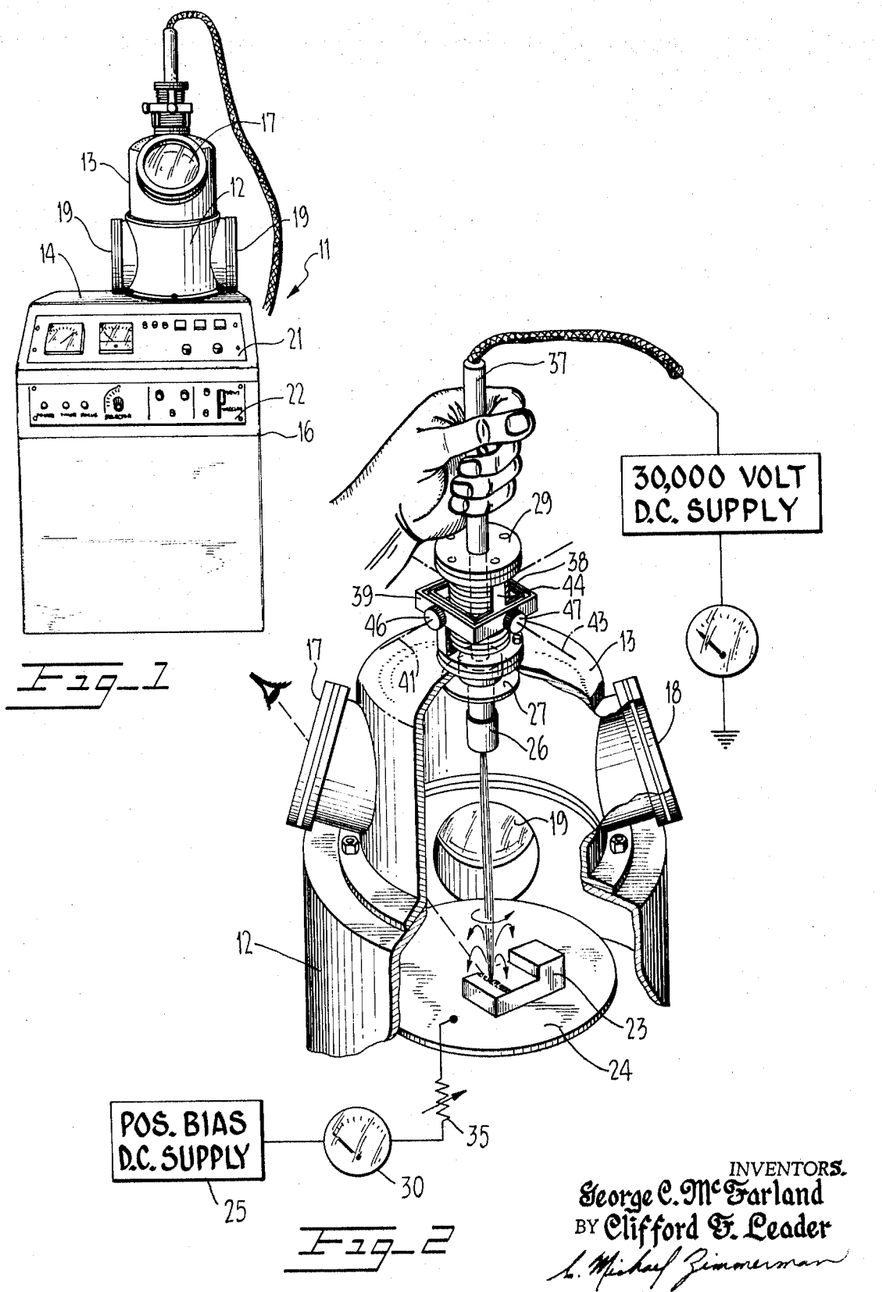
FIG. 1 is an elevation view of a preferred embodiment of the apparatus of the invention.
FIG. 2 is an enlarged broken away perspective view of the gun and work chambers of the embodiment of FIG. 1.

There is shown in FIG. 1 a preferred embodiment of the invention, generally referred to by the reference numeral 11, which is especially adapted for electron beam welding, brazing and annealing. The unit 11 includes a generally cylindrical work chamber 12 within which the object or workpiece to be irradiated is supportable, and a generally dome shaped gun chamber 13 above the work chamber for housing means for generating an electron beam.

The work chamber 12 and gun chamber 13 are hermetically secured together as shown, and are mounted in a vacuum tight relationship on the upper planer surface 14 of a cabinet 16. The chambers 12 and 13 and the cabinet surface 14 thus define a hermetically enclosed volume within which an electron beam can be generated and impinge a workpiece to the irradiated. As is illustrated, the gun chamber 13 includes a pair of opposite viewing ports 17 and 18 for viewing and illuminating, respectively, work in progress within the work chamber. The work chamber 12 includes a pair of access ports 19 for providing access to the interior of the work chamber to enable workpieces to be changed and also to allow different support fixtures for the workpiece to be used.

The apparatus 11 is a generally self-contained unit. That is, for reasons which will be described in more detail hereinafter, both the power supply for the beam generating means and the vacuum system for evacuating the chambers 12 and 13 are sufficiently compact to be housed together within the cabinet 16. Such cabinet also includes the other controls and circuitry necessary for operation of the system. In this connection, display and controls panels 21 and 22 are provided on the cabinet at locations which facilitate access by an operator to the same. The only external means necessary to use the system is an electrical outlet. Because the unit is generally self-contained and small, it can be brought to the location of the work to be done and thus enables electron beam welding to be used at locations away from a normal welding shop or location.

Figure 3:
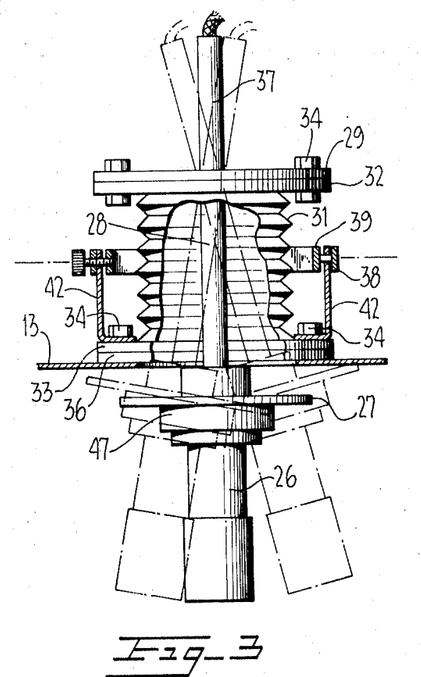
FIG. 3 is an enlarged broken away and partial elevational view of the gun chamber illustrating the manner in which the electron gun is movable.

As a particularly salient feature of the present invention, it includes means by which an operator can vary in a quite simple and direct manner the location on a workpiece at which the beam of radiation impinges. Reference is made to FIGS. 2 and 3 which show such means in detail. The object to be irradiated is diagramatically shown as a workpiece 23 mounted on a support plate 24. It will be appreciated that various types and shapes of objects can be irradiated, and that the means for supporting the same within the work chamber 12 can take various forms and could be, for example, a fixture for continuously moving the workpiece over a prescribed path.

Most desirably, means are provided for applying a positive electrical bias to the support plate 24 for capturing stray electrons within the chamber. That is, a positive dc power supply 25 is connected to the plate through both a meter 30 which provides a visual indication of the total number of electrons collected, and an adjustable resistor 35 which enables the amount of the bias to be simply adjusted.

The means for generating an electron beam is in the form of a gun 26 depending downward from a disc shaped mount 27 positioned adjacent the upper portion of the gun chamber 13. As is illustrated, a mounting rod 28 extends upwardly from disc 27 and is secured to the inner surface of a plate 29 which is also discular shaped.

The plate 29 acts, in effect, as a portion of the wall of the chamber defining the evacuated volume for the irradiation. Moreover, it is secured to the remainder of the chamber wall by connecting means which enable it to be reoriented with respect to the remainder of the wall while maintaining the integrity of the vacuum. In the embodiment illustrated, this connection is obtained via a flexible bellows 31 of metal or other material which includes at its opposite ends vacuum sealing flanges 32 and 33, respectively. Flange 32 is suitably secured in a vacuum type manner to the plate 29, such as by bolts 34, and the flange 33 is secured to a mating vacuum flange 36 at the upper end of chamber 13.

The bellows 31 acts, in effect, as a second wall portion of the chamber which is flexible and connects the plate 29 or first wall portion to the remainder of the chamber wall. It will be recognized, though, that the relative movement between the wall portion 29 and the remainder of the chamber wall could be obtained in other manners. For example, the wall portion 29 could be in the form of a ball which is rotatably mounted within a socket in the wall 13 and to which is secured the gun 26.

The gun mount 27 is rigidly secured to the rod 28 which is, in turn, rigidly secured to the interior surface of plate 29. The result is that the gun mounting arrangement and, hence, the electron gun 26 itself, is mounted to the plate 29 for movement therewith. A handle 37 for grasping by an operator is secured to the plate 29 exteriorly of the chamber 13.

It will be appreciated that by reason of the described structure, an operator of the apparatus can angularly reorient the plate 29 with respect to the remainder of the wall defining the evacuated volume, simply by manipulating the handle 37. That is, the flexible bellows 31 connecting the plate 29 to the gun chamber 13 enables the wall 29 to be tilted in any direction with respect to the horizontal plane normally defined thereby. Such tilting will cause a corresponding movement of the gun 26 within the chamber, and thus changed the path of a beam issuing therefrom to change the location on a workpiece at which the beam impinges.

It will be appreciated that although the positioning means described above for varying the place of impingement of the beam on the workpiece is quite simple, it provides the operator with a good feel of the movement within the chamber he is causing when he manipulates the handle 37. That is, the gun 26 is, in effect, directly connected with the handle 37 so that movement of such handle will cause a corresponding direct movement of the gun. The result is that the operator is able to control the path of the beam on the object being irradiated with the precision which is often necessary to obtain the desired effect.

Locking means are provided for selectively locking the plate 29 in a desired orientation with respect to the remainder of the chamber wall. The locking means will thus hold the electron gun in a selected orientation to maintain the beam of electrons issuing therefrom on a predetermined path to impinge at a specific desired location. More particularly, a pair of rings 38 and 39 coaxially surround the bellows 31 and are gimbally mounted to one another and between the flanges 32 and 33 of the bellows. That is, the outer of the two rings, ring 39, is secured for rotation about the axis 41 on a pair of brackets 42 which extend upwardly from the flange 33, and the inner ring 38 is pivotally secured to the ring 39 for rotation about an axis 43 which is orthogonal to the axis 41. The ring 38 is also secured to the upper flange 32 of the bellows by opposed brackets 44. The resulting structure is a generally conventional gimbal arrangement which enables the desired tilting or reorientation of the plate 29 with respect to the remainder of the chamber wall, while allowing the plate 29 to be locked in a preselected orientation. For this purpose, knobs 46 and 47 are provided for respectively locking via a friction lock or the like, the rings 39 and 39 in a predetermined orientation with respect to another and to the remainder of the structure to hold the plate 29 in a desired orientation.

Figure 4:
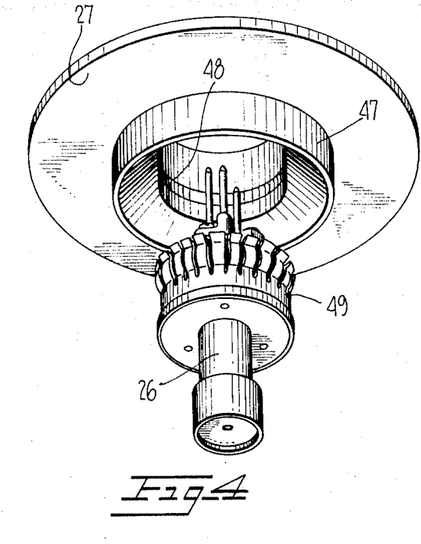
FIG. 4 is a partial perspective view illustrating the means of the preferred embodiment for mounting the electron gun cartridge within the chamber, with such cartridge exploded therefrom.
Figure 5:
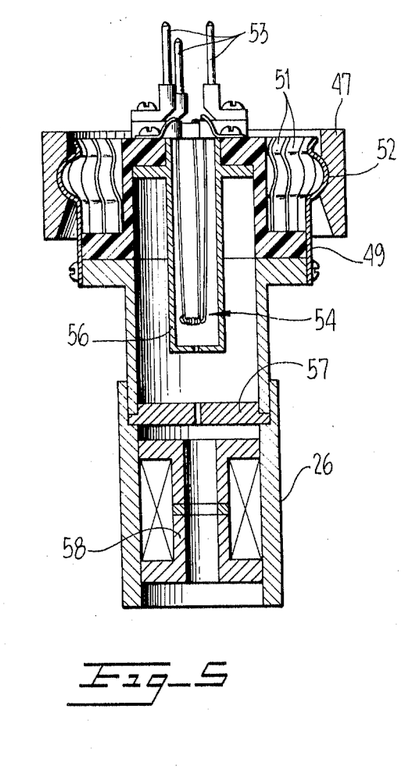
FIG. 5 is an enlarged cross sectional view illustrating the manner in which the electron gun cartridge is removably securable within the chamber.

As another particularly salient feature of the invention, the electron gun 26 mounted within the chamber in a manner which enables easy replacement thereof while yet assuring good electrical contact between it and the mount. That is, the electron gun 26 is provided in the form of a cartridge which can be plugged into the mounting disc 27. A collar 47 depends downwardly from the mounting disc to define therewith a socket for receiving the end portion of the gun, and cooperating means are provided on the gun end portion and the socket for rigidly securing the gun within the socket via a mechanical snap fit while enabling the desired intentional removal of the gun for replacement. More particularly, an indentation in the form of an annular circumferential grove 48 is provided on the inner surface of the socket 47. The rear end portion of the gun is correspondingly provided with a spring metal sleeve 49 which is slotted to provide an annular array of leaf spring fingers 51 as is illustrated. Each of such spring fingers 51 is deformed radially outwardly of the gun to provide a convex protuberance 52 shaped to mate with the groove 48. It will be seen that the resulting plurality of such protuberances will provide a generally annular protuberance around the sleeve 49 which will mate around the full periphery of the gun with the groove. The result is that good physical contact is maintained between the gun and the collar not only to assure a tight mechanical connection between the same but also to assure a good electrical connection between the two. In this regard, the collar 47 and the spring fingers 51 act as an electrical grounding path for the electron gun.

The electron gun cartridge and the socket also include electrical connectors for providing connection between the electrical elements of the gun and the socket when the gun is mechanically secured within such socket. That is, a plurality, in this case three, electrical pins 53, extend upwardly for reception within corresponding pin sockets, (not shown) in the base wall of the gun socket. Such pins are suitably connected with the various electrical components of the gun to provide power and appropriate biasing thereto. Such components include, as is conventional, a heater filament 54 of tungston or the like, enclosed within a cathode cup 56 for providing a bias for single image focusing, an anode 57 for drawing electrons from the filament 54, and a focusing electromagnetic lense 58 for forming and focusing the desired electron beam.

The focusing lense 58 can be made adjustable in order to adjust the focusing of the beam. The various parts of the gun are secured together and maintained in their relationship by conventional parts as shown.

Figure 6:
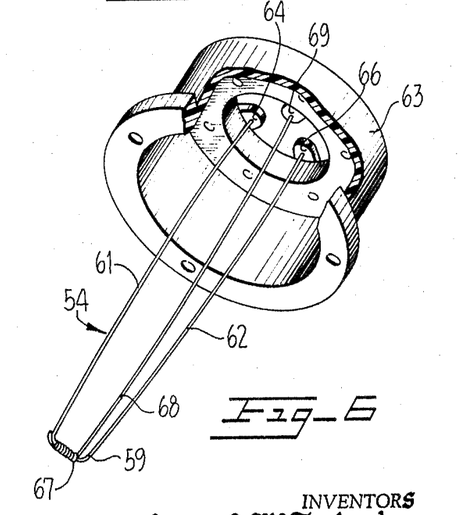
FIG. 6 is a partial perspective view of the filament of the electron gun of FIGS. 4 and 5 depicting the manner in which it is supported within the gun.

The filament 54 is so designed and supported within the gun 26 that its structural integrity is assured at extended high operating temperatures. In this connection, as is best illustrated in FIG. 6, the filament includes a generally U-shaped wire portion 59 having a pair of legs 61 and 62 which are mounted at their ends at spaced locations to an insulator support 63 via inwardly projecting ear terminals 64 and 66. The U-shaped portion of the filament further includes a base 67 which, as is conventional, is the source of electrons to be drawn from the filament by the anode 57. In keeping with the invention, the filament of the electron gun includes an additional third leg 68 which extends between the base 67 and a third ear 69 projecting inwardly of the support 63. It will be seen that the location at which the third leg is secured to the support by the ear 69 is to the side of the locations at which the legs 61 and 62 are secured thereto. This provides the filament with a tripod support which assures three dimensional stability of the filament at all times.

Besides assuring structural integrity of the filament, the leg 68 also enhances the emission of electrons from such filament. That is, the end of such leg which is secured to the base 67 of the filament is so secured thereto by being wrapped therearound. This provides an emitting surface at such base which is enlarged when compared to the emitting surface of conventional U-shaped filaments.

It should be noted that further legs could also be added to the filament to add additional stability thereto. In any event, at least one of the legs in addition to the legs 61 and 63 normally associated with the U-shaped filament, should be secured to the support at a location which is spaced from the locations at which the legs 61 and 63 are secured to provide the desired tripod support.

Figure 7:
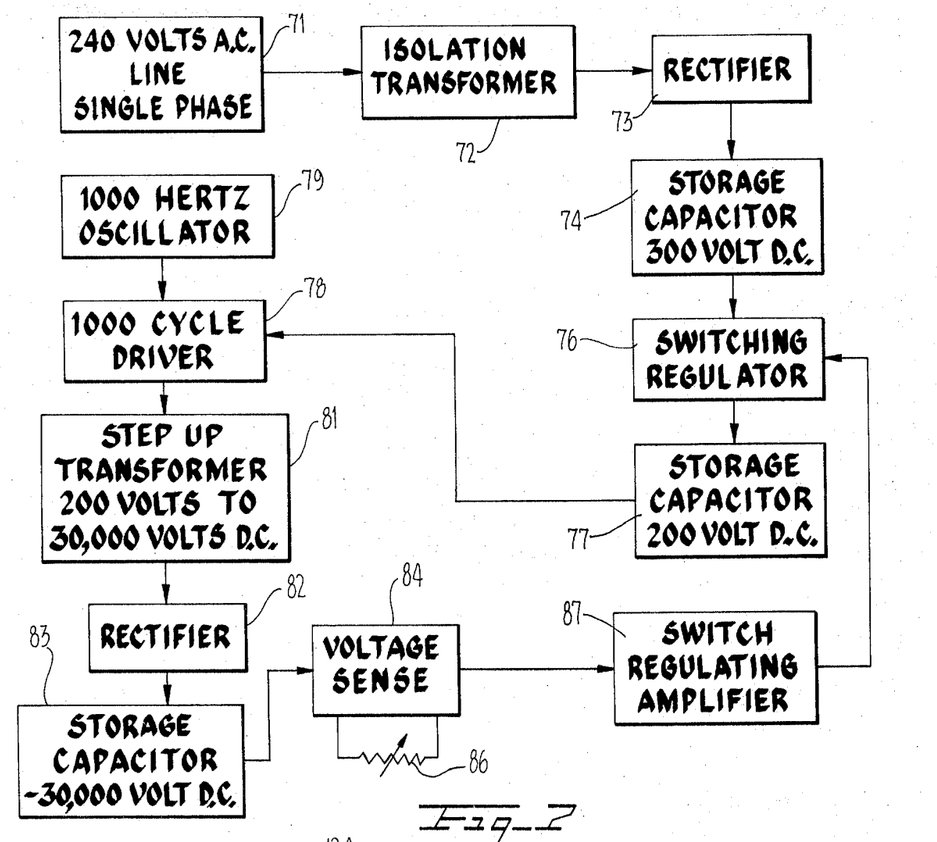
FIG. 7 is a block diagram of the power supply for powering the electron gun of the apparatus of the invention.

As has been mentioned previously, the power supply for powering the filament of the electron gun of the invention is quite compact and yet assures that the generated electron beam is quite steady, i.e., continuously maintains a desired power level. FIG. 7 is a block diagram illustrating the major components of such power supply and how they interrelate. Block 71 of the diagram represents an external supply of 240 volts alternating current, such as is commonly found on industrial power supply lines. The power on the line is fed first into an isolation transformer 72 of the power supply of the invention which protects the remaining components of the power supply from changes which might occur to the external power. The unchanged but current limited voltage from the isolation transformer is fed to a rectifier 73 which converts the 240 volt alternating current to 300 volt direct current. Such current is fed from the rectifier to a storage capacitor 74.

The 300 volt charge stored on capacitor 74 is fed through a switching regulator 76 to another storage capacitor which is maintained at nominally 200 volts direct current. As will be explained hereinafter, a feed back arrangement is provided for controlling the switching regulator to assure that the charge stored on the capacitor 77 is sufficient to provide the desired voltage. The capacitor 77 is connecred with a 1,000 cycle driver 78, the oscillation for which is provided by an oscillator 79. The resulting 1,000 cycle voltage is fed to a step up transformer 81 which converts the same from 200 volts to 30,000 volts. From such transformer the voltage passes via a rectifier 82 which eliminates the positive portion of the cycle to deliver to a storage capacitor 83, a 30,000 volt negative charge. The capacitor 83 is directly connected through a series limiting tube (not shown) with the filament 54 of the electron gun to deliver to it the necessary voltage for generating electrons.

As mentioned previously, means are provided in the power supply for assuring that the voltage maintained on the storage capacitor 83 is maintained at a negative 30,000 volts. In this connection, a voltage sensing device 84 is connected with the storage capacitor to determine any voltage changes thereon. Such voltage sensing device can be adjustable as by way of an adjustable resistor schematically illustrated at 86 to enable one to set it for a desired voltage sense. The voltage sensing device 84 reacts to any change in the voltage on the storage capacitor 83 by driving a switch regulating amplifier 87 which, in turn, drives the switch regulator 76 to assure that the charge fed from storage capacitor 74 to capacitor 77 is sufficient to maintain the capacitor 77 at the required 200 volts level. This will assure that the storage capacitor 83 is also maintained at the desired 30,000 negative d.c. voltage.

The inclusion in th power supply of the 1,000 cycle oscillator and driver for oscillating the voltage assures that a sufficiently steady state charge is maintained on the storage capacitor 83 to maintain the electron beam generated by the gun correspondingly steady. That is, the resulting electron beam will be a so-called "low ripple" beam. Moreover, the increase of the voltage from the 240 volts provided by the external source to 30,000 volts correspondingly reduces the amount of charge which must be maintained on the capacitor 83. Thus such capacitor can be quite compact and enables the power supply to be housed within the cabinet 16.

Figure 8:
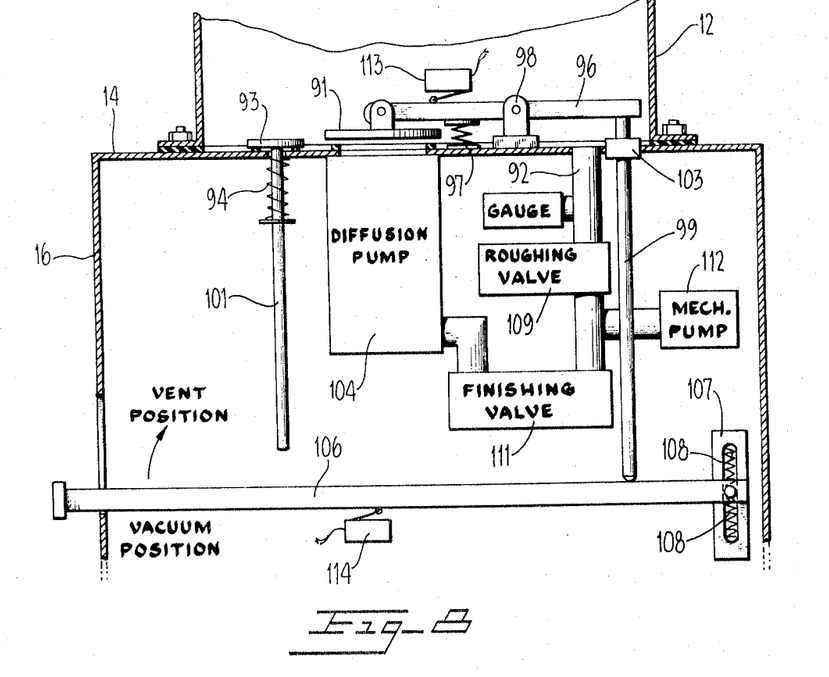
FIG. 8 is a schematic showing of the vacuum system for the apparatus of the invention and the control valve arrangement therefor.

The full vacuum system for evacuating the work and gun chambers 12 and 13 is also housed within the cabinet 16. As a particularly salient feature of the instant invention, the vacuum system includes a valve control arrangement which enables the system to be simply controlled by an operator while yet utilizing one mechanical pump for both rough pumping and as a finishing pump for a diffusion pump. The valve control arrangement also assures failsafe operation of the system. FIG. 8 is a schematic representation of such system as assembled within the apparatus of the invention. More particularly, the cabinet 16 is shown in cross-section with the work chamber 12 mounted on its upper surface 14. The vacuum system communicates with the chamber 12 via a diffusion pump valve 91 and a line 92 which is provided for rough pumping of the chamber. A vent valve 93 is also provided for selectively communicating the chamber with atmospheric pressure or, in other words, venting the chamber.

The valve control arrangement includes spring means for normally maintaining the valves 91 and 93 open and closed, respectively. More particularly, the vent valve 93 is spring loaded by a compression spring 94 to the closed position shown, and the diffusion pump valve 91 is mounted on a lever 96 which is spring loaded upward by a compression spring 97 to maintain the diffusion pump valve in the open position. As is illustrated, the lever 96 is pivoted on a support 98 which is intermediate its ends.

Each of the valves 91 and 93 are also provided with a drive rod 99 and 101, respectively for actuating the same against the pressure of the spring means. That is, the drive rod 99 associated with the diffusion pump valve extends upwardly from within the cabinet 16 through a mechanical vacuum gland 103 to a location at which its upper end is engagable with the free end of the valve lever 96. The drive rod 101 associated with the vent valve extends downwardly from such valve to terminate within the housing 16.

It will be seen that with this arrangement both of the drive rods 99 and 101 are axially translatable in the upward direction to overcome the pressure of the springs associated with their respective valves to actuate the same. That is, upward movement of the drive rod 99 will compress the spring 97 to close the valve plate 91 over the valve opening leading to the diffusion pump 104. Upward axial translation of the drive rod 101 will likewise compress the compression spring 94 associated with the valve 93 to lift the valve disc of 93 from the opening leading to the atmospheric pressure within the cabinet 16.

An activating lever 106 is provided for engaging the lower free ends of both of the drive rods 99 and 101 to axially translate the same to operate their respective valves. As a particularly salient feature of the instant invention, the lever 106 is so designed and mounted with respect to the remainder of the control apparatus that it assures that the diffusion pump valve is fully closed prior to such lever opening the valve 93 to vent the chamber 12 to the atmosphere. That is, the lever 106 is positioned adjacent to free ends of both of the rods and is pivotally mounted at one of its ends in a pivot structure 107 which provides a resilient pivot point for the lever. That is, a pin on the free end of the lever is positioned between two compression springs 108 which normally define the pivot point. It will be appreciated however, that such pivot point is releasable or movable against the pressure of either of such springs.

The actuating lever is so positioned and pivotally mounted with respect to the free ends of the drive rods 99 and 101 that upon being pivoted upward into the vent position, such lever will first engage the rod 99 and translate the same upward to the extent necessary to close the valve 91 over the diffusion pump prior to engaging the rod 101 associated with the vent valve 93. This assures that the diffusion pump is not brought up to atmospheric pressure.

It will be appreciated that if the activating lever 106 were fixedly pivoted within the cabinet 16, once the valve 91 is closed over the diffusion pump valve opening, further upward movement of the activating lever would be prevented by the rod 99. However, the pivot point provided by the spring loaded pivot mounting 107 will be overridden by any force tending to move the lever 106 further upward with result that the free end of the rod 99 will become the pivot point for the lever. The lever can thus be continued to be moved upward to engage the rod 101 and open the vent valve. Conventional catch means (not shown) can be provided for maintaining the lever 106 in the vent position.

The vacuum system of the invention also includes sensing means for determining the position of the diffusion pump valves and the activating lever 106 and utilizing such sensing to control a roughing valve 109 and a finishing or fore pump valve 111 to selectively communicate a mechanical pump 112 with either the chamber 12 for rough pumping the chamber or the diffusion pump for pumping the latter. More particularly, a pair of microswitches 113 and 114 are located at positions at which they will be respectively contacted by the valve lever 96 and activating lever 106 in preselected positions thereof. To facilitate an understanding of such valve control arrangement, it will be described in terms of its operation. When the activating lever 106 is in the vent position, the microswitch 114 will sense the same and close the roughing valve while at the same time open the fore pump valve if the diffusion pump is on. Upon the lever being brought to the vacuum position, the microswitch 114 will close the fore pump valve and open the roughing valve so that the mechanical pump 112 can rough pump the chamber 12. It will be appreciated that the diffusion pump valve 91 will remain closed at this time until the pressure within chamber 12 is reduced to such a point at which the pressure on the valve plate 91 will be insufficient to overcome the compression of spring 97. The force of spring 97 is chosen to not cause opening of the diffusion pump valve until the pressure within chamber 12 has been reduced by the mechanical pump 112 to such a degree that the diffusion pump can effectively operate. Upon the valve 91 being opened at such time, the microswitch 113 will sense the opening and close the roughing valve while also opening the fore pump valve so that the mechanical pump is communicated with the diffusion pump to provide for pumping of the same.

It can be seen from the above that even though only one control, lever 106, need be operated by a user of the apparatus, the valve control arrangement of the invention provides all actuations that are necessary to assure failsafe operation. Moreover, it enables one mechanical pump, pump 112, to serve two functions. This facilitates making the vacuum system a compact arrangement which can be included within the cabinet 16.

Figure 9:
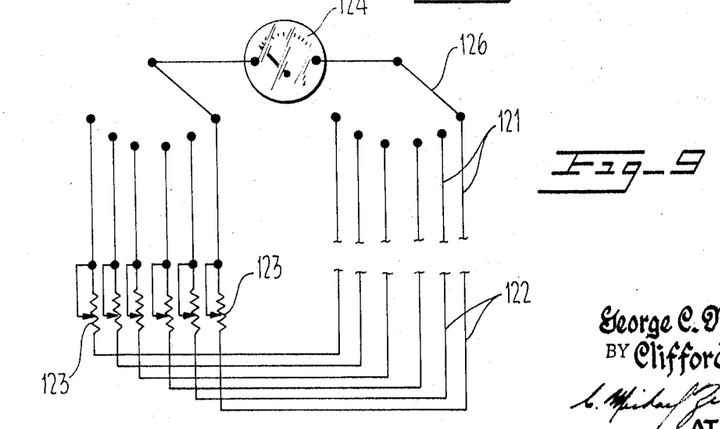
FIG. 9 is a diagramatic illustration of a check system for determining whether or not various components of the apparatus are functioning correctly.

The electron beam generating apparatus of the invention also includes means for determining in a quite simple manner whether or not different components of the arrangement are functioning correctly. More particularly, with reference to FIG. 9, a simple testing circuit is illustrated for determining whether or not, for example, the various components of the power supply are functioning correctly. To this end, each of the components which is to be tested is placed in electrical communication via a pair of leads 121 and 122 of the testing system with a voltage sensing means 123 which can be in the form of an adjustable resistor. The testing system further includes visual indicating means in the form of a voltage registering meter 124, for example, for measuring the voltage sensed by each of the resistors 123. Switching means 126 are also provided for selectively connecting each one of the individual resistors 123 with the indicating means to provide a reading on the meter representative of the functioning of the component associated with the resistor so electrically connected with the meter. For example, one pair of the leads 121 and 122 can be connected across the 300 volt storage capacitor of the power supply and a reading obtained on the meter 124 indicative of whether or not such capacitor truly has 300 volts across it. Another one of the pair of leads 121 and 122 can be connected across the microswitch 113 of the vacuum system to indicate on the meter 124 whether or not the diffusion pump valve 91 is open or not open as the case may be.

While the apparatus of the invention has been described with respect to a preferred embodiment, it will be appreciated by those skilled in the art that various changes and modifications are possible. For example, although all of the features described above cooperate to provide in combination an improved apparatus for generating an electron beam which is especially adaptable for portable electron beam welding and the like, various ones of the features can find use independently of the others. In this connection, the particular arrangement described for manipulating the electron gun is also applicable to other systems which may or may not be portable. Mooreover, the gun chamber which includes this manipulating means can be made separatable from environments. In light of this and other potential modifications, it is intended that the coverage afforded applicant be limited only by the claims.

We claim:

1. Apparatus for directing impingement of a electron beam onto an object to be irradiated thereby, comprising a chamber having a wall for defining an evacuated volume adjoining the portion of said object to be irradiated; means mounted within said chamber on a first movable portion of the chamber wall for generating said electron beam; and positioning means for varying the angle of the path of said beam with respect to said object, said positioning means including connecting means hermetically securing said first portion of said wall to the remainder of the chamber wall in a manner enabling angular reorientation of said first portion of said wall with respect to the remainder of said wall; a handle secured to said first portion of said wall exteriorly of said chamber for grasping by an operator for pivotal manipulation to provide said angular reorientation of said first wall portion and to consequently pivot said beam introducing means to change the angle at which said beam is introduced into said chamber; locking means for selectively locking said first portion of said chamber wall in a desired angular orientation with respect to the remainder of said wall to thereby enable selective locking of said electron beam generating means in a desired orientation for maintaining an electron beam issuing therefrom at a desired angle with respect to said object; a high vacuum system for evacuating said chamber to a vacuum enabling the formation of said electron beam; an electrical power supply for producing the high voltage necessary for operation of said electron beam generating means; and a high voltage electrical lead extending hermetically through the wall of said chamber for connecting said electron beam generating means to said power supply.

2. The apparatus of claim 1 wherein a support plate is provided within said chamber for supporting an object to be irradiated, and means are provided for applying a positive electrical bias to said plate for capturing stray electrons within said chamber.

3. The apparatus of claim 1 wherein said connecting means is a flexible second wall portion of said chamber secured between said first wall portion and the remainder of the chamber wall.

4. The apparatus of claim 3 wherein said second wall portion of said chamber is a generally cylindrical flexible bellows interposed between said first wall portion and the remainder of the chamber wall.

5. The apparatus of claim 4 wherein said locking means includes a pair of gimbally mounted rings surrounding said bellows and connected between said first wall portion and the remainder of the chamber wall, and a lock for maintaining said rings and hence said bellows in a predetermined orientation.

6. The apparatus of claim 1 wherein said means for generating said electron beam is an electron gun; and means are provided for removably mounting said gun within said chamber on said first wall portion, said means comprising a socket associated with said first wall portion of said chamber for receiving an end portion of the body of said electron gun, cooperating means on said gun and at said socket for removably securing said end portion of said gun within said socket with a mechanical snap fit, and cooperating electrical connectors on said gun and at said socket for providing connection between electrical elements of said gun and said socket when said gun end portion is mechanically secured within said socket.

7. The apparatus of claim 6 wherein said electron gun includes a generally U-shaped filament for emitting electrons which is mounted at spaced locations on a support via its two legs, an anode mounted adjacent the base of said U-shaped wire filament for drawing electrons therefrom, and focusing means for defining an electron beam with said electrons, said filament including a third leg secured between said base of said filament and a location on said support which is to the side of the locations at which the legs of said U-shaped portion thereof are secured, whereby a tripod support is provided for said filament to enable the same to maintain its structural integrity at extended high operating temperatures.

8. The apparatus of claim 6 wherein a power supply for said electron gun is provided as a part of said combination and includes rectifying means for converting alternating line current to direct current and transformer means for converting the voltage of said line current to a substantially higher voltage, and wherein a support plate is provided within said chamber for supporting an object to be irradiated, and means are provided for applying a positive electrical bias to said plate for capturing stray electrons within said chamber.

9. The apparatus of claim 8 wherein testing means are provided for electrically determining whether or not different components of said apparatus are functioning correctly, said testing means including a plurality of voltage sensing means, each one of which is in electrical communication with a respective one of said components to be tested, indicating means for registering a sensed voltage, and switching means for electrically connecting said indicating means individually with each of said voltage sensing means to provide indications representative of the functioning of the component associated with the voltage sensing means electrically connected with said indicating means.

10. The apparatus of claim 9 wherein a pair of valves are provided for selectively communicating said chamber with atmospheric pressure and with a diffusion pump of said vacuum system; and actuating means for said valves are provided which comprise means for normally maintaining the diffusion pump valve in an open position while maintaining the atmospheric pressure valve in a closed position, first and second generally parallel drive rods respectively associated with said diffusion pump valve and said atmospheric pressure valve, both of which rods are axially translatable to actuated positions respectively closing said diffusion pump valve and opening said atmospheric pressure valve, an activating lever positioned adjacent the free ends of both of said rods for engagement therewith to provide said axial translation, means pivotally mounting said lever at a position relative to said free ends whereby upon being pivoted said lever engages the rod associated with said diffusion pump valve and axially translates the same to its fully actuated position to close said valve before engaging the rod associated with said atmospheric pressure valve, said pivot means being releasable to enable the free end of the rod associated with said diffusion pump valve to become the pivot point of said lever for continued movement of said lever in the same direction for engagement with the free end of the rod associated with said atmospheric pressure valve rod to translate the latter rod to its fully activated position, whereby the closing of said diffusion pump valve is completed prior to the opening of said atmospheric pressure valve.

11. Apparatus for directing impingement of an electron beam onto an object comprising a chamber for defining an evacuated volume; an electron gun for generating an electron beam; and means for removably securing said electron gun with said chamber comprising a socket associated with a wall portion of said chamber for receiving an end portion of the body of said electron gun, cooperating means on said gun and at said socket for removably securing said end portion of said gun within said socket with a mechanical snap fit, and cooperating electrical connectors on said gun and at said socket for providing connection between the electrical elements of said gun and said socket when said gun end portion is mechanically secured within said socket, said cooperating means on said gun and at said socket for removably securing said end portion of said gun within said socket with a mechanical snap fit including an indentation on one of said end portions of said gun and said socket and a protuberance adapted to mate with said indentation of the other of said end portion of said gun and said socket, and one of said protuberance and the means defining the indentation being resiliently mounted on its associated member to enable movement thereof against said resiliency to permit mating of said protuberance with said deformation.

12. The apparatus of claim 11 in which said indentation is a circumferential groove on the inner surface of said socket and said protuberance is provided by an annularly arrayed plurality of leaf spring fingers projecting axially of said gun and being deformed radially outwardly of said gun to provide in the aggregate a circumferential protuberance for mating with said groove within said socket.

13. Apparatus for generating an electron beam for impingement onto an object comprising a generally U-shaped wire filament for emitting electrons, which filament is mounted via its two legs at spaced locations on a support; an anode mounted adjacent the base of said U-shaped wire filament for drawing electrons from said base; and focusing means for defining an electron beam with said electrons, said filament including a third leg secured between said base of said filament and a location on said support which is to the side of the spaced locations thereon at which the legs of said U-shaped portion of said filament are secured, whereby a tripod support is provided for said filament to enable the same to maintain its structural integrity at extended high operating temperatures.

14. The apparatus of claim 13 wherein said third leg is a wire leg and is secured to said base of said U-shaped wire filament by being wrapped therearound to also provide said filament with an enlarged electron emitting surface.

15. Apparatus for directing the impingement of a beam of radiation onto an object comprising a chamber for defining an evacuated volume adjoining the portion of the object to be irradiated; means for generating the desired beam of radiation in said evacuated volume; a power supply for powering said beam generating means; and testing means for electrically determining whether or not selected different components of said apparatus are functioning correctly, said testing means including as parts of said apparatus a plurality of voltage sensing means, each one of which is in electrical communication with a respective one of said components to be tested, indicating means as part of said apparatus for visually registering a sensed voltage, and manually operable switching means on said apparatus for electrically connecting said indicating means individually with each of said voltage sensing means to provide indications visually representative of the functioning of the component associated with the voltage sensing means electrically connected with said indicating means.

16. Apparatus for activating a pair of valves of a high vacuum system comprising means for normally maintaining a first one of said valves in an open position and the second one thereof in a closed position; first and second generally parallel drive rods respectively associated with said first and second valves, both of said rods being axially translatable in the same direction to actuated positions respectively closing said first valve and opening said second valve; an activating lever positioned adjacent the free ends of both of said rods for engagement therewith to provide said axial translation; and means pivotally mounting said lever at a position relative to said free ends at which upon being pivoted said lever engages one of said rods and axially translates the same to its fully actuated position before engaging the other, said one of said rods being prevented from substantially any further axial translation in said direction upon reaching said fully actuated position, and said pivot means being releasable to enable the free end of the engaged rod to become the pivot point of said lever for continued movement of said lever in the same direction for engagement with the free end of the other one of said rods to translate the latter rod to its fully actuated position, whereby the actuation of one of said valves by said lever is completed prior to the actuation of the other.

* * * * *